(12) United States Patent
Funasaka et al.

(10) Patent No.: US 11,499,541 B2
(45) Date of Patent: Nov. 15, 2022

(54) DIAPHRAGM COMPRESSOR, COOLING UNIT, PROJECTOR, RECORDING APPARATUS, AND THREE-DIMENSIONAL MODELED OBJECT MANUFACTURING APPARATUS

(71) Applicant: Seiko Epson Corporation, Tokyo (JP)

(72) Inventors: Tsukasa Funasaka, Shiojiri (JP); Yuki Hanamura, Azumino (JP); Yasunori Onishi, Shiojiri (JP)

(73) Assignee: SEIKO EPSON CORPORATION

( * ) Notice: Subject to any disclaimer, the term of this patent is extended or adjusted under 35 U.S.C. 154(b) by 155 days.

(21) Appl. No.: 16/910,182

(22) Filed: Jun. 24, 2020

(65) Prior Publication Data

US 2020/0408203 A1 Dec. 31, 2020

(30) Foreign Application Priority Data

Jun. 25, 2019 (JP) .............................. JP2019-117094

(51) Int. Cl.
*F04B 45/047* (2006.01)
*F04B 25/00* (2006.01)
(Continued)

(52) U.S. Cl.
CPC ............ *F04B 45/047* (2013.01); *F04B 25/00* (2013.01); *F04B 41/02* (2013.01); *F04B 41/06* (2013.01);
(Continued)

(58) Field of Classification Search
CPC ...... F04B 45/047; F04B 45/04; F04B 45/043; F04B 45/045; F04B 43/046; F04B 43/026;
(Continued)

(56) References Cited

U.S. PATENT DOCUMENTS 1,570,995 A * 1/1926 De Lony ................. F25B 31/00
62/115
3,386,647 A * 6/1968 Sorensen ................ F25B 31/00
417/385
(Continued)

FOREIGN PATENT DOCUMENTS

CN 102914103 A 2/2013
CN 203404051 U 1/2014
(Continued)

*Primary Examiner* — Charles G Freay
(74) *Attorney, Agent, or Firm* — Harness, Dickey & Pierce, P.L.C.

(57) ABSTRACT

A diaphragm compressor includes first structure having a first pressing part, a first diaphragm, and a first substrate partially separated from the first diaphragm and partially joined to the first diaphragm, a second structure having a second pressing part, a second diaphragm, and a second substrate partially separated from the second diaphragm and partially joined to the second diaphragm, the first structure and the second structure being stacked in a stacking direction in which the first diaphragm and the first substrate are stacked, wherein the first pressing part is placed at sides of the first diaphragm opposite to the first substrate, and a first separation portion between the first diaphragm and the first substrate is part of a first channel in which a fluid flows, the second pressing part is placed at sides of the second diaphragm opposite to the second substrate, and a second separation portion between the second diaphragm and the second substrate is part of a second channel in which a fluid flows, the first channel and the second channel are placed in series, as seen from the stacking direction, the first pressing part overlaps the second pressing part, and a buffer chamber holding the fluid is provided between the first channel and the second channel.

6 Claims, 11 Drawing Sheets

(51) Int. Cl.
*F25B 31/00* (2006.01)
*F04B 53/16* (2006.01)
*F04B 45/04* (2006.01)
*F25B 39/00* (2006.01)
*F04B 41/06* (2006.01)
*F04B 41/02* (2006.01)

(52) U.S. Cl.
CPC .......... *F04B 45/04* (2013.01); *F04B 45/045* (2013.01); *F04B 53/16* (2013.01); *F25B 39/00* (2013.01); *F25B 31/00* (2013.01)

(58) Field of Classification Search
CPC .......... F04B 25/00; F04B 41/02; F25B 31/00; F25B 39/00
See application file for complete search history.

(56) References Cited

U.S. PATENT DOCUMENTS

| | | | | |
|---|---|---|---|---|
| 4,093,403 A | * | 6/1978 | Schrimpf | F04B 43/026 417/246 |
| 2016/0106903 A1 | * | 4/2016 | Nilsson | F04B 43/026 417/244 |
| 2017/0127956 A1 | * | 5/2017 | Hirata | F16K 31/02 |

FOREIGN PATENT DOCUMENTS

| | | | |
|---|---|---|---|
| CN | 109681414 A | | 4/2019 |
| DE | 102019117261 | * | 1/2020 |
| JP | 2002-106468 A | | 4/2002 |
| JP | 2002-213365 A | | 7/2002 |
| JP | 2013-032875 A | | 2/2013 |
| JP | 106224214 | * | 12/2016 |

* cited by examiner

DIAPHRAGM COMPRESSOR, COOLING UNIT, PROJECTOR, RECORDING APPARATUS, AND THREE-DIMENSIONAL MODELED OBJECT MANUFACTURING APPARATUS

The present application is based on, and claims priority from JP Application Serial Number 2019-117094, filed Jun. 25, 2019, the disclosure of which is hereby incorporated by reference herein in its entirety.

BACKGROUND

1. Technical Field

The present disclosure relates to a diaphragm compressor, cooling unit, projector, recording apparatus, and three-dimensional modeled object manufacturing apparatus.

2. Related Art

In related art, various diaphragm compressors including diaphragms and compression units that press the diaphragms so that fluids can flow in and out. For example, JP-A-2002-106468 discloses a diaphragm pump having a diaphragm and a pump chamber and transferring a fluid by reciprocating motion of the diaphragm. Further, JP-A-2002-213365 discloses a diaphragm pump having a fluid chamber partitioned by a partition board.

However, in the diaphragm compressors of related art including the diaphragm pumps disclosed in JP-A-2002-106468 and JP-A-2002-213365, it is hard to effectively compress fluids. Further, by simple coupling of two or more structures having diaphragms and compression chambers for compression of fluids, it may be hard to effectively send out the fluids, and the entire compressor is upsized.

SUMMARY

A diaphragm compressor according to an aspect of the present disclosure includes two of structures having pressing parts, diaphragms, and a substrate partially separated from and partially joined to the diaphragms in a stacking direction in which the diaphragms and the substrate are stacked, wherein, in the respective two structures, the pressing parts are placed at sides of the diaphragms opposite to the substrate, and separation portions between the diaphragms and the substrate are parts of channels in which a fluid flows, the respective channels of the two structures are placed in series, as seen from the stacking direction, the respective pressing parts of the two structures overlap, and a buffer chamber holding the fluid is provided between the respective channels of the two structures.

DESCRIPTION OF EXEMPLARY EMBODIMENTS

Figure 1:
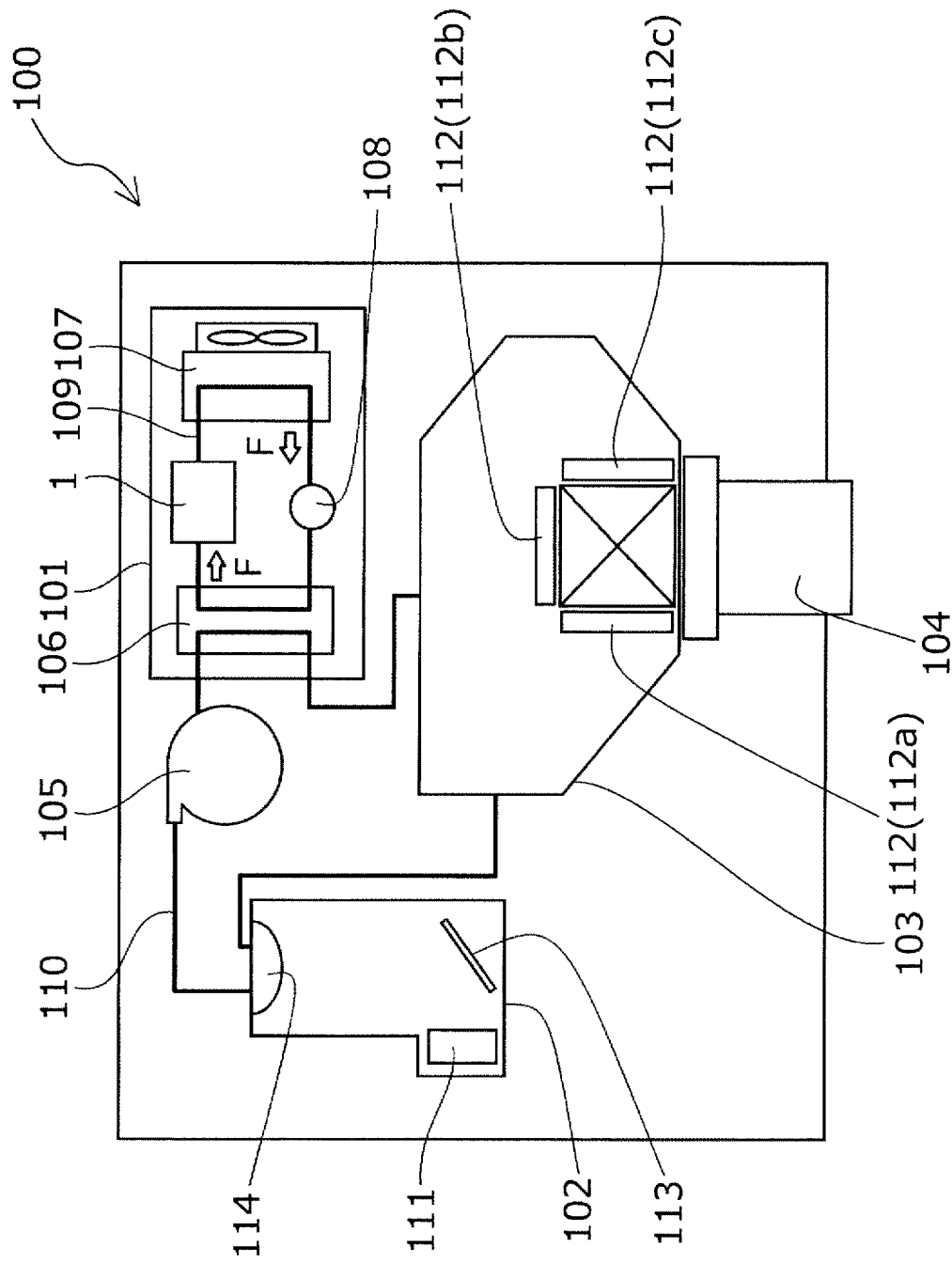
FIG. 1 is a schematic diagram showing an example of using a diaphragm compressor according to Example 1 of the present disclosure in a projector.

First, the present disclosure will be schematically explained.

A diaphragm compressor according to a first embodiment of the present disclosure includes two of structures having pressing parts, diaphragms, and a substrate partially separated from and partially joined to the diaphragms in a stacking direction in which the diaphragms and the substrate are stacked, wherein, in the respective two structures, the pressing parts are placed at sides of the diaphragms opposite to the substrate, and separation portions between the diaphragms and the substrate are parts of channels in which a fluid flows, the respective channels of the two structures are placed in series, as seen from the stacking direction, the respective pressing parts of the two structures overlap, and a buffer chamber holding the fluid is provided between the respective channels of the two structures.

According to the embodiment, the fluid may be effectively compressed by the two structures. Further, the single member has the respective channels of the two structures placed in series, and thereby, the compressor can be downsized. Further, the buffer chamber holding the fluid is provided between the respective fluid channels of the two structures and thereby the compressor may be configured to press the two pressing parts simultaneously at fewer steps, the fluid may be effectively sent out and the compressor may be downsized particularly effectively by simplification of the compressor configuration. Therefore, the small diaphragm compressor that can effectively compress the fluid may be obtained.

The diaphragm compressor according to a second embodiment of the present disclosure, in the first embodiment, a displacement expanding device is provided, wherein the displacement expanding device has a displacement member coupled to the pressing parts of the two structures, and an actuator coupled to the displacement member.

According to the embodiment, the displacement expanding device is provided, and thereby, the two pressing parts may be effectively pressed and the diaphragm compressor that can particularly effectively compress the fluid may be obtained.

The diaphragm compressor according to a third embodiment of the present disclosure, in the second embodiment, in the displacement expanding device, the actuator is placed to be displaced in directions crossing the stacking direction and coupled to the displacement member in a position apart at each side from a center position of a length of the actuator in the directions of displacement of the actuator.

According to the embodiment, the actuator is configured to be placed to be displaced in directions crossing the stacking direction and coupled to the displacement member in the position apart at each side from the center position of the length of the actuator in the directions of displacement of the actuator, and thereby, the displacement expanding device having the simple configuration may be obtained. Therefore, the particularly small diaphragm compressor that can effectively compress the fluid may be obtained.

A cooling unit according to a fourth embodiment of the present disclosure includes the diaphragm compressor according to any one of the first to third embodiments, a heat dissipation section for the fluid, a heat exchanger section for the fluid, and an expansion section for the fluid, wherein the diaphragm compressor is placed between the heat exchanger section and the heat dissipation section.

According to the embodiment, the small diaphragm compressor that can effectively compress the fluid at fewer steps is provided, and thereby, the small and high-performance cooling unit may be obtained.

A projector according to a fifth embodiment of the present disclosure includes a light source, a panel absorbing light, a heat exchange medium, and the cooling unit according to the fourth embodiment, wherein the heat exchange medium is provided between one of the light source and the panel and the heat exchanger section.

According to the embodiment, the small diaphragm compressor that can effectively compress the fluid at fewer steps is provided, and thereby, the small and high-performance projector may be obtained.

A recording apparatus according to a sixth embodiment of the present disclosure includes a recording head ejecting an ink, an electronic circuit board coupled to the recording head, a heat exchange medium, and the cooling unit according to the fourth embodiment, wherein the heat exchange medium is provided between one of the recording head and the electronic circuit board and the heat exchanger section.

According to the embodiment, the small diaphragm compressor that can effectively compress the fluid at fewer steps is provided, and thereby, the small and high-performance recording apparatus may be obtained.

A three-dimensional modeled object manufacturing apparatus according to a seventh embodiment of the present disclosure includes a hopper holding a raw material as a constituent material of a three-dimensional modeled object, a melting unit melting the raw material, a feed path for feeding the raw material from the hopper to the melting unit, a heat exchange medium, and the cooling unit according to the fourth embodiment, wherein the heat exchange medium is provided between the feed path and the heat exchanger section.

According to the embodiment, the small diaphragm compressor that can effectively compress the fluid at fewer steps is provided, and thereby, the small and high-performance three-dimensional modeled object manufacturing apparatus may be obtained.

As below, a diaphragm compressor according to one example of the present disclosure will be explained in detail with reference to the accompanying drawings. First, apparatuses that can use the diaphragm compressor 1 according to one example of the present disclosure will be described.

Projector

First, referring to FIG. 1, a projector 100 as an example of the apparatuses using the diaphragm compressor 1 according to one example of the present disclosure will be described.

The projector 100 shown in FIG. 1 includes a light source unit 102 having a light source 114, a fluorescent material 111, a dichroic mirror 113, etc. Further, the projector includes an optical element unit 103 having panels 112 with an optical element for red light 112a, an optical element for green light 112b, and an optical element for blue light 112c, a projection lens 104, etc. Furthermore, the projector includes a cooling unit 101 for cooling the light source unit 102 and the optical element unit 103. Here, the panels 112 are optical elements that absorb lights radiated from the light source 114.

The cooling unit 101 includes the diaphragm compressor 1 of the example, which will be described later in detail, a heat exchanger section 107, an expansion section 108 for a fluid as a refrigerant, an evaporator 106 as a heat dissipation section, etc., and is configured so that a primary refrigerant may flow in a primary refrigerant pipe 109 in directions F. According to such a configuration, the cooling unit 101 may cool the light source unit 102 and the optical element unit 103 as objects to be cooled, i.e., the light source 114 and the panels 112.

The primary refrigerant is compressed by the diaphragm compressor 1 and the temperature thereof rises. Here, the primary refrigerant flowing into the diaphragm compressor 1 is a low-pressure gas and the primary refrigerant flowing out of the diaphragm compressor 1 is a high-pressure gas.

The primary refrigerant compressed by the diaphragm compressor 1 is cooled to a predetermined temperature in the heat exchanger section 107. Here, the primary refrigerant cooled in the heat exchanger section 107 is a high-pressure liquid.

The primary refrigerant cooled in the heat exchanger section 107 is expanded in the expansion section 108 and the temperature thereof falls. Here, the primary refrigerant expanded in the expansion section 108 is a low-pressure liquid.

In the evaporator 106, the primary refrigerant is changed from the liquid to a gas within the evaporator 106 and the heat within the evaporator 106 is absorbed. Here, the light source unit 102, the optical element unit 103, and the cooling unit 101 are coupled by a secondary refrigerant pipe 110, and a secondary refrigerant circulates in the secondary refrigerant pipe 110 by a liquid feed pump 105. That is, the secondary refrigerant and the secondary refrigerant pipe 110 as heat exchange media are provided between the light source 114 and panels 112 and the heat exchanger section 107. Further, the primary refrigerant pipe 109 and the secondary refrigerant pipe 110 are placed side by side inside of the evaporator 106 of the cooling unit 101. The evaporator 106 has such a internal configuration, and thereby, the secondary refrigerant is cooled inside of the evaporator 106 at a lower temperature after the primary refrigerant is changed from the liquid to the gas. The cooled secondary refrigerant circulates in the light source unit 102 and the optical element unit 103, and thereby, the light source unit 102 and the optical element unit 103 are cooled.

As described above, the heat exchanger section 107 is configured to receive heat from the light source 114 and the panels 112. The heat exchanger section 107 is configured to receive heat from at least one of the light source 114 and the panels 112, and thereby, the small and high-performance projector may be obtained.

Recording Apparatus

Next, a recording apparatus 200 as an example of the apparatuses using the diaphragm compressor 1 according to one example of the present disclosure will be described with reference to FIGS. 2 and 3. Note that the cooling unit 101 used in the recording apparatus 200 has the same configuration as the cooling unit 101 in FIG. 1, and the detailed explanation of the cooling unit 101 will be omitted.

Figure 2:
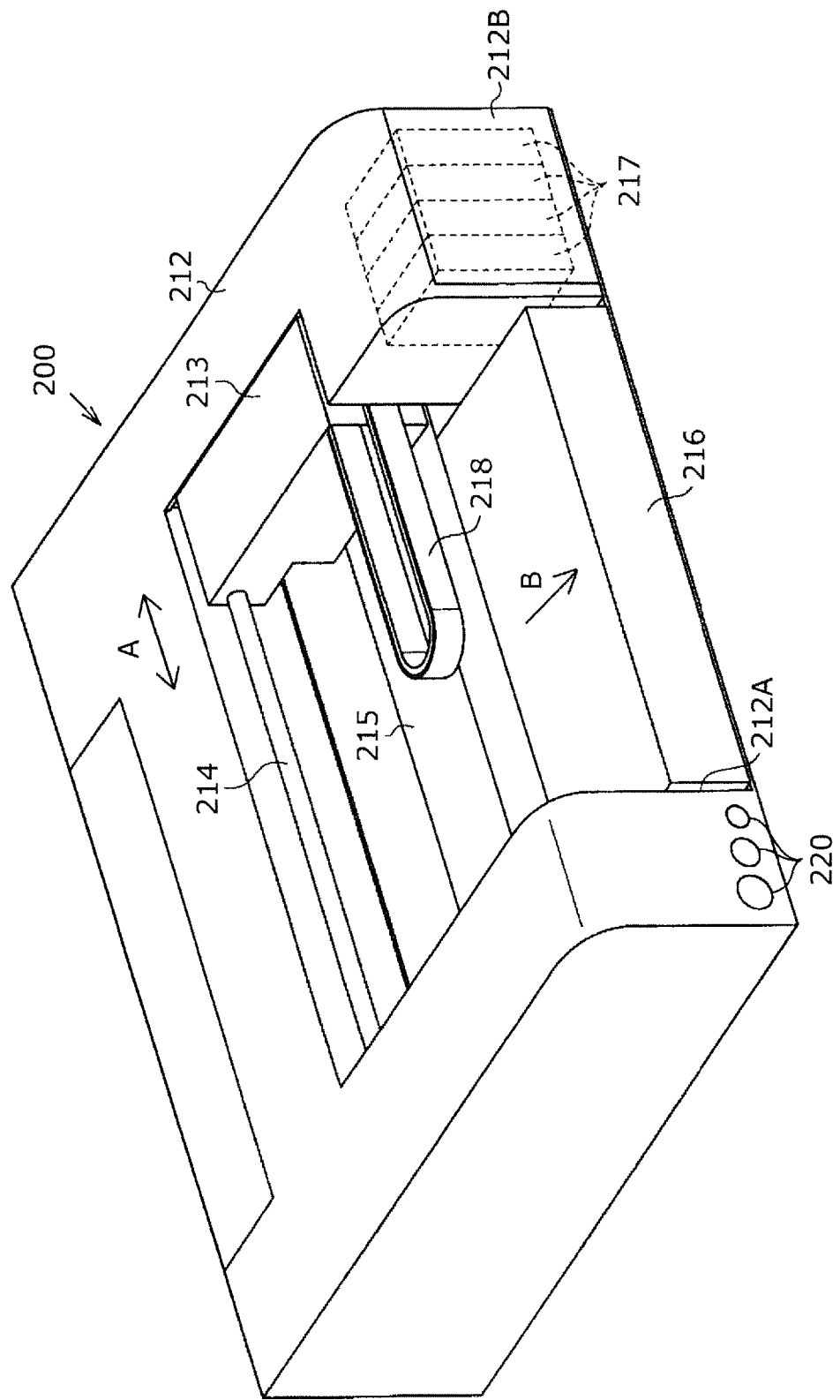
FIG. 2 is a schematic diagram showing an example of a recording apparatus that can use the diaphragm compressor according to Example 1 of the present disclosure.

As shown in FIG. 2, the recording apparatus 200 has a main body 212 in a box shape, and a carriage 213 is provided in the center region of the main body 212 to be reciprocable in main-scan directions A with guidance by a guide main shaft 214 laid over to extend along the main-scan directions A in FIG. 2.

As shown in FIG. 2, a platen 215 as a medium supporting part in an elongated plate shape is placed in the longitudinal directions parallel to the main-scan directions in a lower position facing the carriage 213 in the center region of the main body 212. A paper feed cassette 216 is attached to the front lower portion of the recording apparatus 200 to be inserted into and ejected from a recessed attachment part 212A formed to open at the front side in the main body 212. Further, a plurality of ink cartridges 217 are loaded inside of a cover 212B covering the front surface at the right end of the main body 212.

Figure 3:
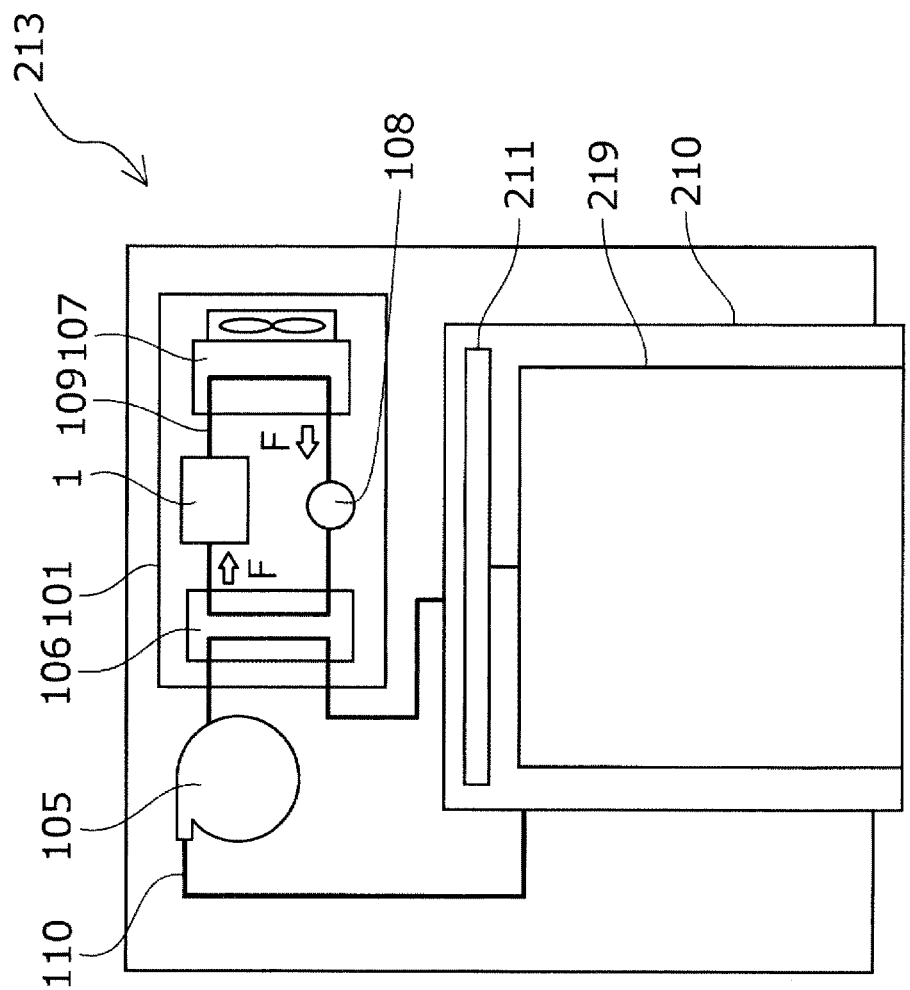
FIG. 3 is a schematic diagram showing an example of using the diaphragm compressor according to Example 1 of the present disclosure in the recording apparatus.

The inks of the respective ink cartridges 217 are respectively supplied to the carriage 213 through a plurality of ink supply tubes (not shown) provided on a flexible wiring board 218, and ink droplets are ejected from a recording head 219 provided in the lower part of the carriage 213 as shown in FIG. 3. Note that, in the recording head 219, pressurizing elements (piezoelectric elements, electrostatic elements, heating elements, or the like) that apply pressure for ejection of the inks to the inks are provided with respect to each nozzle. Predetermined voltages are applied to the pressurizing elements, and thereby, ink droplets are ejected from the corresponding nozzles.

At recording, a recorded medium is fed from the cassette 216, the ink droplets are ejected from the recording head 219 in the process of moving in the main-scan directions A with the carriage 213 to the recorded medium located on the platen 215, and thereby, recording for one line is performed. In this manner, the recording action by single scanning with the carriage 213 and the feed action of the recorded medium to the next line in a feed direction B are alternately repeated, and thereby, recording on the recorded medium is carried out. Further, various operation switches 220 including a power switch are provided on the front lower part at the left end of the main body 212. Note that, with the recording, temperatures of the recording head 219 and an electronic circuit board 211 that sends a drive signal to the recording head 219 rise. When the temperature of the recording head 219 rises, the properties of the inks in the ink supply paths within the recording head 219 including the nozzles may change and the ejection performance may be lower. When the temperature of the electronic circuit board 211 rises, the drive signal may be erroneously transmitted.

Accordingly, as shown in FIG. 3, the cooling unit 101, the liquid feed pump 105, and the secondary refrigerant pipe 110 are provided in the carriage 213 like the projector 100 in FIG. 1. Here, the secondary refrigerant and the secondary refrigerant pipe 110 as heat exchange media are provided between the recording head 219 and electronic circuit board 211 and the heat exchanger section 107. In the carriage 213, a head unit 210 including the recording head 219 and the electronic circuit board 211 coupled to the recording head 219 is provided, and the heat exchanger section 107 of the cooling unit 101 is configured to receive heat from the recording head 219 and the electronic circuit board 211. The heat exchanger section 107 is configured to receive heat from at least one of the recording head 219 and the electronic circuit board 211, and thereby, the small and high-performance recording apparatus may be obtained.

Three-Dimensional Modeled Object Manufacturing Apparatus

Figure 4:
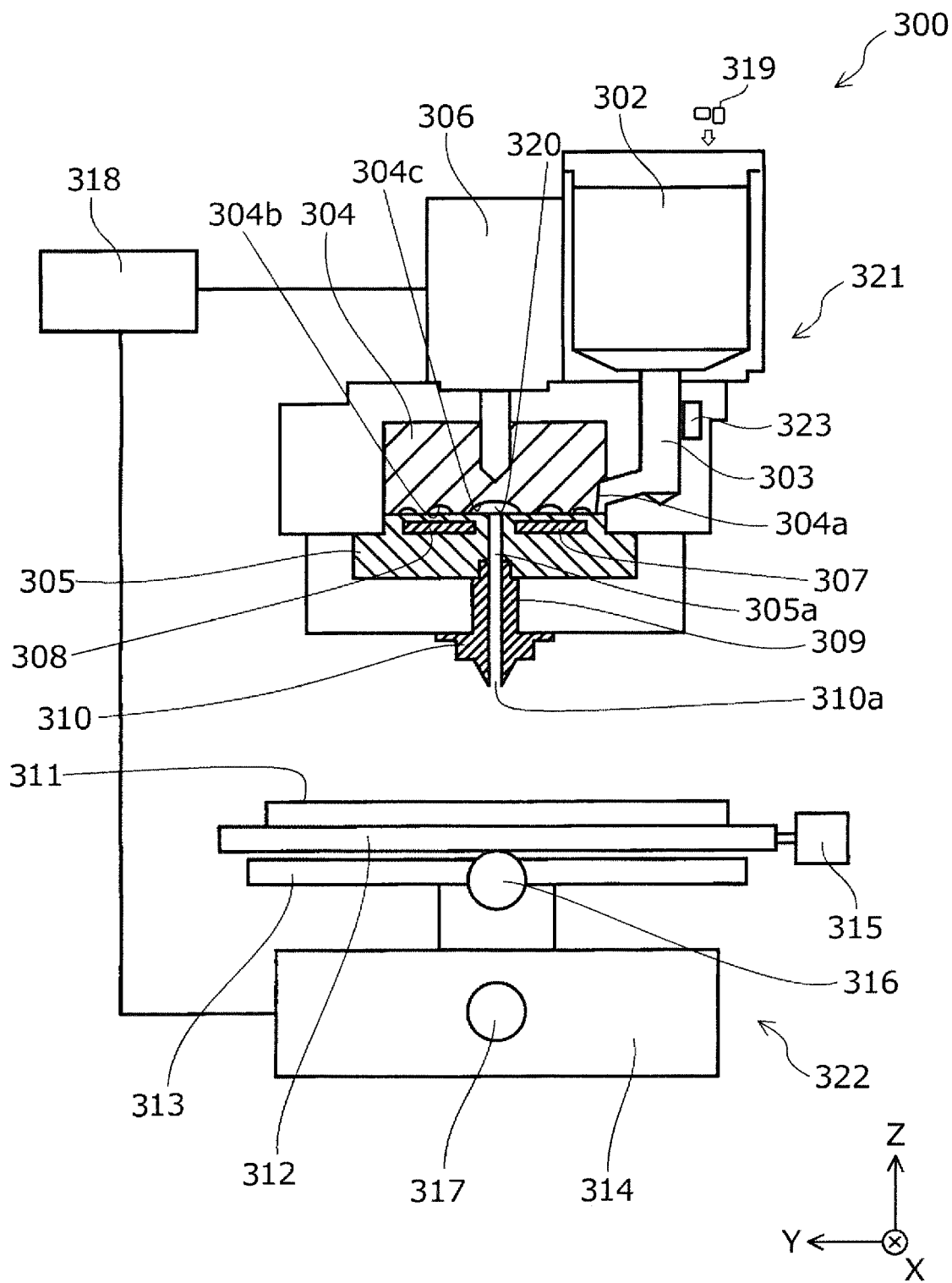
FIG. 4 is a schematic diagram showing an example of a three-dimensional modeling apparatus that can use the diaphragm compressor according to Example 1 of the present disclosure.
Figure 5:
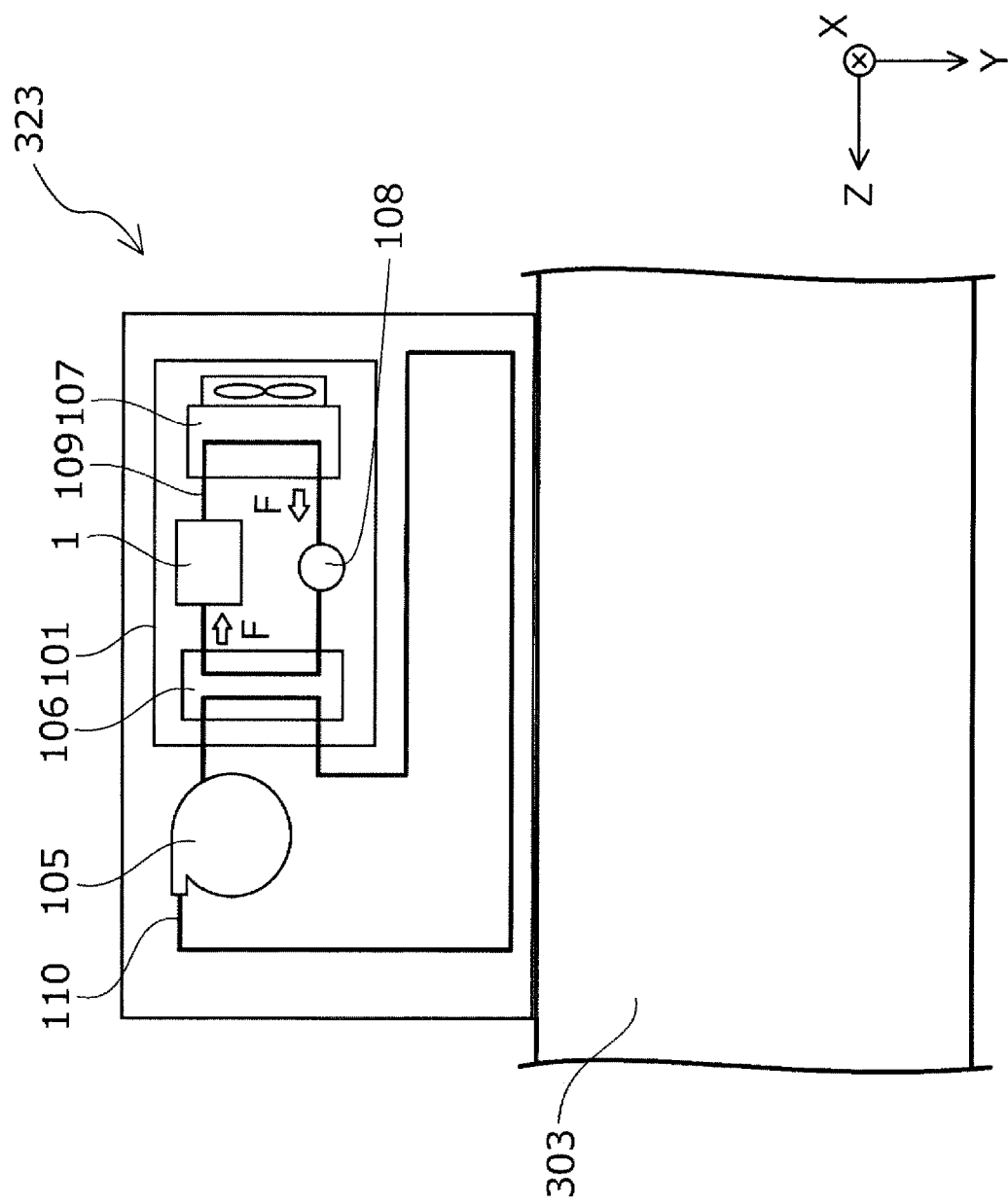
FIG. 5 is a schematic diagram showing an example of using the diaphragm compressor according to Example 1 of the present disclosure in the three-dimensional modeling apparatus.

Next, a three-dimensional modeled object manufacturing apparatus 300 as an example of the apparatuses using the diaphragm compressor 1 according to one example of the present disclosure will be described with reference to FIGS. 4 and 5. Note that the cooling unit 101 used in the three-dimensional modeled object manufacturing apparatus 300 has the same configuration as the cooling unit 101 in FIG. 1, and the detailed explanation of the cooling unit 101 will be omitted. Here, X directions in FIGS. 4 and 5 are horizontal directions and Y directions are horizontal directions orthogonal to the X directions. Further, Z directions are vertical directions.

Note that "three-dimensional modeling" in this specification refers to formation of the so-called solid modelled object, and includes formation of e.g. a planar shape such as a shape formed by a single layer, even the so-called two-dimensional shape having a thickness.

As shown in FIG. 4, the three-dimensional modeled object manufacturing apparatus 300 includes a hopper 302 holding pellets 319 as a constituent material (raw material) forming a three-dimensional modeled object. The pellets 319 held in the hopper 302 are fed to a circumferential surface 304a of a flat screw 304 in a substantially cylindrical shape via a feed path 303.

A helical cutout 304b from the circumferential surface 304a to a center portion 304c is formed on a bottom surface of the flat screw 304. Accordingly, the flat screw 304 is rotated about a rotation axis in directions along the Z directions by a motor 306, and thereby, the pellets 319 are moved from the circumferential surface 304a to the center portion 304c.

A barrel 305 is provided at a predetermined distance in a position facing the bottom surface of the flat screw 304. Further, a heater 307 and a heater 308 are provided near the upper surface of the barrel 305. The flat screw 304 and the barrel 305 have the above described configurations, and thereby, when the flat screw 304 is rotated, the pellets 319 are fed to a space portion 320 by the cutout 304b formed between the bottom surface of the flat screw 304 and the upper surface of the barrel 305 and move from the circumferential surface 304a to the center portion 304c. Note that, when the pellets 319 move in the space portion 320 by the cutout 304b, the pellets 319 are melted, that is, plasticized by the heat of the heater 307 and the heater 308 and pressurized by pressure with movement in the narrow space portion 320. In this manner, the pellets 319 are plasticized, and thereby, the fluid constituent material is injected from a nozzle 310a.

In a plan view, in the center portion of the barrel 305, a movement path 305a for the constituent material as the melted pellets 319 is formed. The movement path 305a connects to the nozzle 310a of an injection part 310 for injection of the constituent material.

The injection part 310 is configured to continuously inject the constituent material in the fluid state from the nozzle 310a. Note that, in the injection part 310, a heater 309 for setting the constituent material at a desired viscosity is provided. The constituent material injected from the injection part 310 is injected in a linear shape. The constituent material is linearly injected from the injection part 310, and thereby, a layer of the constituent material is formed.

In the three-dimensional modeled object manufacturing apparatus 300 in FIG. 4, the hopper 302, the feed path 303, the flat screw 304, the barrel 305, the motor 306, the injection part 310, etc. form an injection unit 321. Note that the three-dimensional modeled object manufacturing apparatus 300 of the example includes the single injection unit 321 that injects the constituent material, however, may include a plurality of the injection units 321 that inject constituent materials.

Further, the three-dimensional modeled object manufacturing apparatus 300 includes a stage unit 322 for mounting the layer formed by injection from the injection unit 321. The stage unit 322 includes a plate 311 on which the layer is actually mounted. Further, the stage unit 322 includes a first stage 312 on which the plate 311 is mounted in a position changeable along the Y directions by driving of a first drive part 315. Furthermore, the stage unit 322 includes a second stage 313 on which the first stage 312 is mounted in a position changeable along the X directions by driving of a second drive part 316. In addition, the stage unit 322 includes a base part 314 that can change the position of the second stage 313 along the Z directions by driving of a third drive part 317.

The three-dimensional modeled object manufacturing apparatus 300 is electrically coupled to a control unit 318 that controls various kinds of driving of the injection unit 321 and various kinds of driving of the stage unit 322.

Further, the three-dimensional modeled object manufacturing apparatus 300 includes a feed path cooling part 323 for cooling the feed path 303. The feed path cooling part 323 is a device for cooling the feed path 303 to suppress feed failure of the pellets 319 in the feed path 303 due to heating of the feed path 303 by the heater 307, the heater 308, and the heater 309 and melting of the pellets 319 in the feed path 303.

As shown in FIG. 5, in the feed path cooling part 323, the cooling unit 101, the liquid feed pump 105, and the secondary refrigerant pipe 110 are provided like the projector 100 in FIG. 1 and the carriage 213 in FIG. 2. The secondary refrigerant pipe 110 is placed near the feed path 303 and the heat exchanger section 107 of the cooling unit 101 is configured to receive heat from the feed path 303. That is, the secondary refrigerant and the secondary refrigerant pipe 110 as heat exchange media are provided between the feed path 303 and the heat exchanger section 107. As described above, the heat exchanger section 107 of the cooling unit 101 is configured to receive heat from the feed path 303, and thereby, the small and high-performance three-dimensional modeled object manufacturing apparatus may be obtained.

Diaphragm Compressor

EXAMPLE 1

Next, referring to FIGS. 6 and 7, a configuration of the diaphragm compressor 1 of Example 1 (diaphragm compressor 1A) will be explained in detail. Note that, in FIGS. 6 and 7, part of the component members may be varied from their actual shapes by simplification or the like for a clear understanding of the schematic structures.

Figure 6:
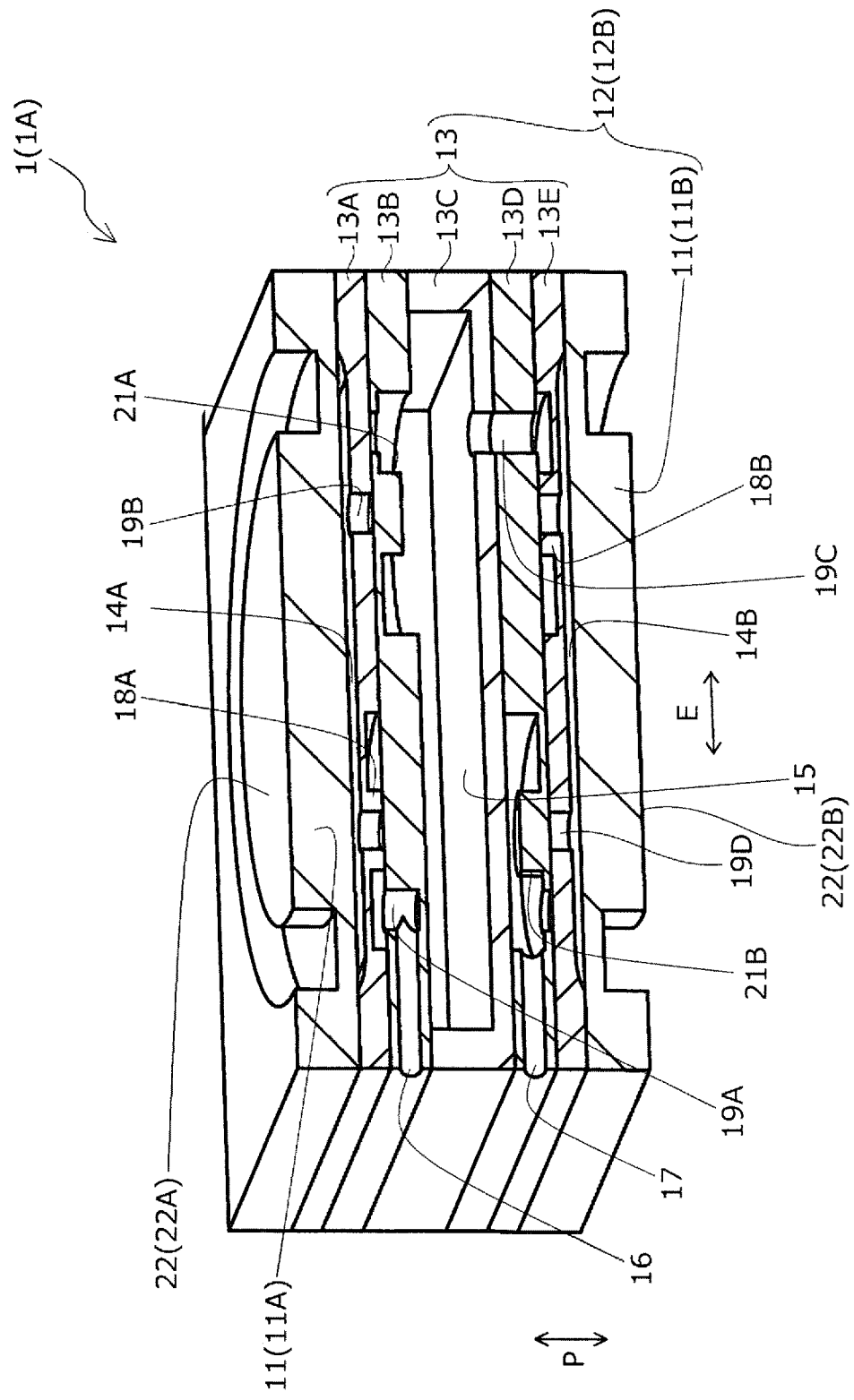
FIG. 6 is a schematic perspective sectional view of the diaphragm compressor according to Example 1 of the present disclosure.
Figure 7:
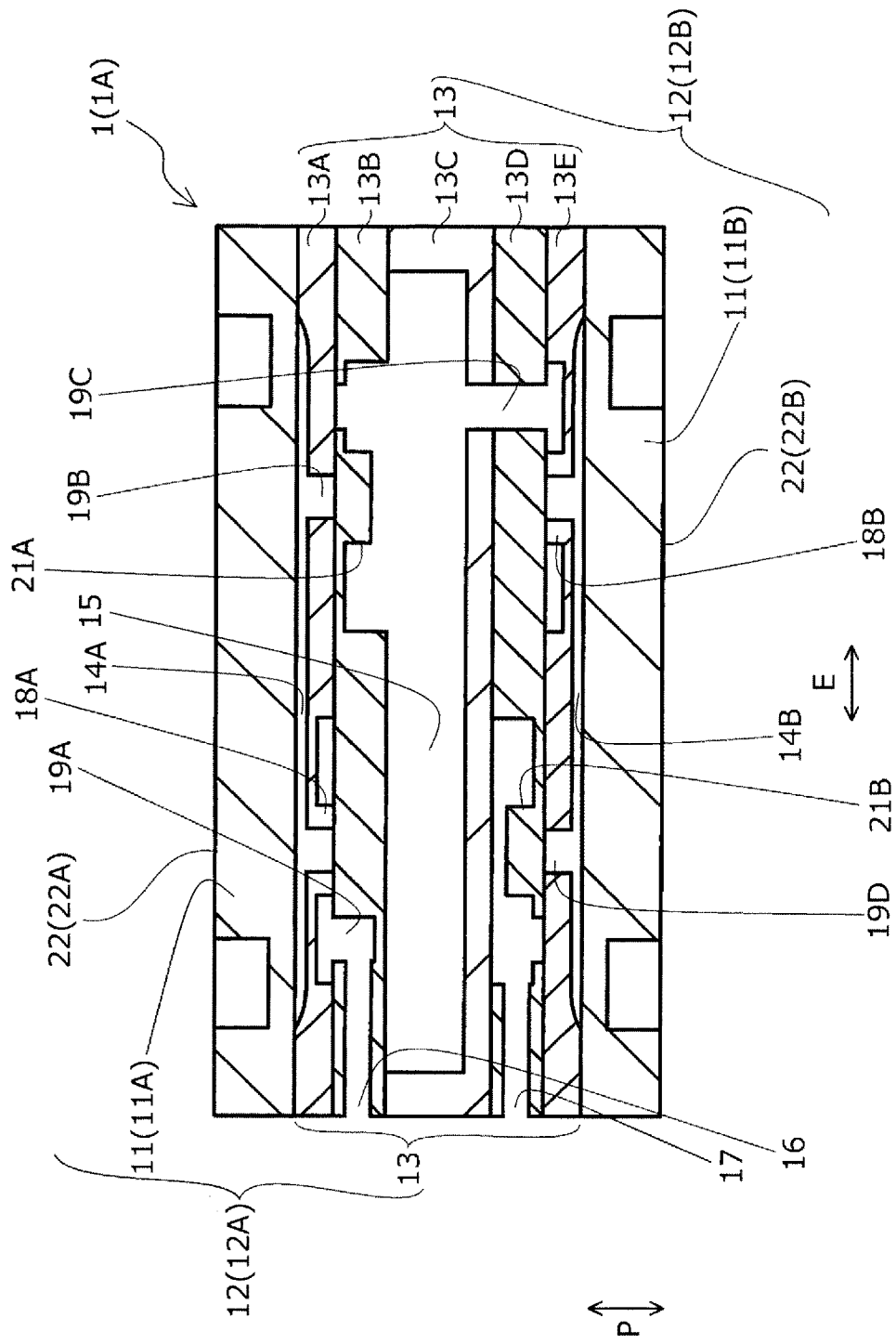
FIG. 7 is a schematic front sectional view of the diaphragm compressor according to Example 1 of the present disclosure.

As shown in FIGS. 6 and 7, the diaphragm compressor 1A of the example has two diaphragms 11 of a diaphragm 11A and a diaphragm 11B. Further, the diaphragm compressor 1A of the example is provided with two pressing parts 22 of a pressing part 22A that presses the diaphragm 11A and a pressing part 22B that presses the diaphragm 11B. Here, "pressing" configuration can not only "pushing, pressurizing" but also "pulling" with the release of pressing. Therefore, by "pulling" the pressing parts 22, a chamber 14A and a chamber 14B as compression chambers are negatively pressurized and the refrigerant as a fluid is drawn in.

As shown in FIGS. 6 and 7, the diaphragm compressor 1A of the example includes a substrate 13 between the diaphragm 11A and the diaphragm 11B. Further, the diaphragm 11A and the substrate 13 forms a structure 12A and the diaphragm 11B and the substrate 13 forms a structure 12B. As described above, the diaphragm compressor 1A of the example includes the two structures 12 of the structure 12A and the structure 12B in an overlap placement as seen from pressing directions P corresponding to a stacking direction in which the diaphragms 11 and the substrate 13 are stacked. Further, in the diaphragm compressor 1A of the example, the pressing part 22A, the diaphragm 11A, the substrate 13, the diaphragm 11B, and the pressing part 22B are sequentially placed as seen from the pressing directions P.

In the diaphragm compressor 1A of the example, as shown in FIGS. 6 and 7, the substrate 13 has a first plate part 13A, a second plate part 13B, a third plate part 13C, a fourth plate part 13D, and a fifth plate part 13E. The first plate part 13A is placed in a position in contact with the diaphragm 11A in the pressing directions P, and the chamber 14A that can hold the refrigerant as the fluid, an inlet valve 18A that opens and closes a fluid path 19A from an inlet port 16 to the chamber 14A, and a fluid path 19B are provided therein. The first plate part 13A has the above described configuration and is partially separated from and partially joined to the diaphragm 11A. The separation portion between the diaphragm 11A and the first plate part 13A forms a part of a channel in which the fluid flows.

The second plate part 13B is placed in a position in contact with the first plate part 13A in the pressing directions P, and the inlet port 16 from which the fluid can be taken in from the outside, the fluid path 19A, and an outlet valve 21A that opens and closes the fluid path 19B from the chamber 14A to a buffer chamber 15 are provided therein. The third plate part 13C is placed in a position in contact with the second plate part 13B in the pressing directions P, and the buffer chamber 15 that can hold the fluid and a part of a fluid path 19C from the buffer chamber 15 to the chamber 14B are provided therein. The fourth plate part 13D is placed in a position in contact with the third plate part 13C in the pressing directions P, and a part of the fluid path 19C, an outlet port 17 from which the fluid can be ejected to the outside, and an outlet valve 21B that opens and closes a fluid path 19D from the chamber 14B to the outlet port 17 are provided therein.

The fifth plate part 13E is placed in a position in contact with the fourth plate part 13D and the diaphragm 11B in the pressing directions P, and the chamber 14B that can hold the fluid, an inlet valve 18B that opens and closes the fluid path 19C, and the fluid path 19D are provided therein. The fifth plate part 13E has the above described configuration and is partially separated from and partially joined to the diaphragm 11B. The separation portion between the diaphragm 11B and the fifth plate part 13E forms a part of the channel in which the fluid flows. The substrate 13 of the example has the above described configuration, and thereby, it may be expressed that the respective fluid channels of the two structures 12A and 12B are placed in series.

In summary, the diaphragm compressor 1 of the example includes the two of the structures 12 (structures 12A and 12B) having the pressing parts 22, the diaphragms 11, and the substrate 13 partially separated from and partially joined to the diaphragms 11 in the pressing directions P as the stacking direction in which the diaphragms 11 and the substrate 13 are stacked. In the respective two structures 12A and 12B, the pressing parts 22 are placed at sides of the diaphragms 11 opposite to the substrate 13. Further, as described above, the separation portions between the diaphragms 11 and the substrate 13 are the parts of the channels in which the fluid flows, the respective fluid channels of the two structures 12A and 12B are placed in series, and the buffer chamber 15 holding the fluid is provided between the respective fluid channels of the two structures 12A and 12B. As seen from the pressing directions P, the respective pressing parts 22A and 22B of the two structures 12A and 12B overlap.

The diaphragm compressor 1 of the example may effectively compress the fluid by the two structures 12A and 12B. The single member has the respective channels of the two structures 12A and 12B placed in series, and thereby, the compressor can be downsized. Further, the buffer chamber 15 holding the fluid is provided between the respective channels of the two structures 12A and 12B and the two pressing parts 22A and 22B may be simultaneously pressed at fewer steps, and thereby, the fluid may be effectively sent out and the compressor may be downsized particularly effectively by simplification of the compressor configuration. Therefore, the diaphragm compressor 1 of the example is small and can effectively compress the fluid. Note that the fluid is sent out at the fewer steps, and thereby, the fluid may be sent out at a higher flow rate in the fluid channels.

EXAMPLE 2

Next, the diaphragm compressor 1 (diaphragm compressor 1B) according to Example 2 of the present disclosure will be explained with reference to FIGS. 8 to 10. Here, as shown in FIG. 10, the diaphragm compressor 1B of the example has a configuration formed only by addition of a displacement expanding device 20 to the diaphragm compressor 1A of Example 1. The component members in common with Example 1 have the same signs and the detailed explanation will be omitted.

Figure 8:
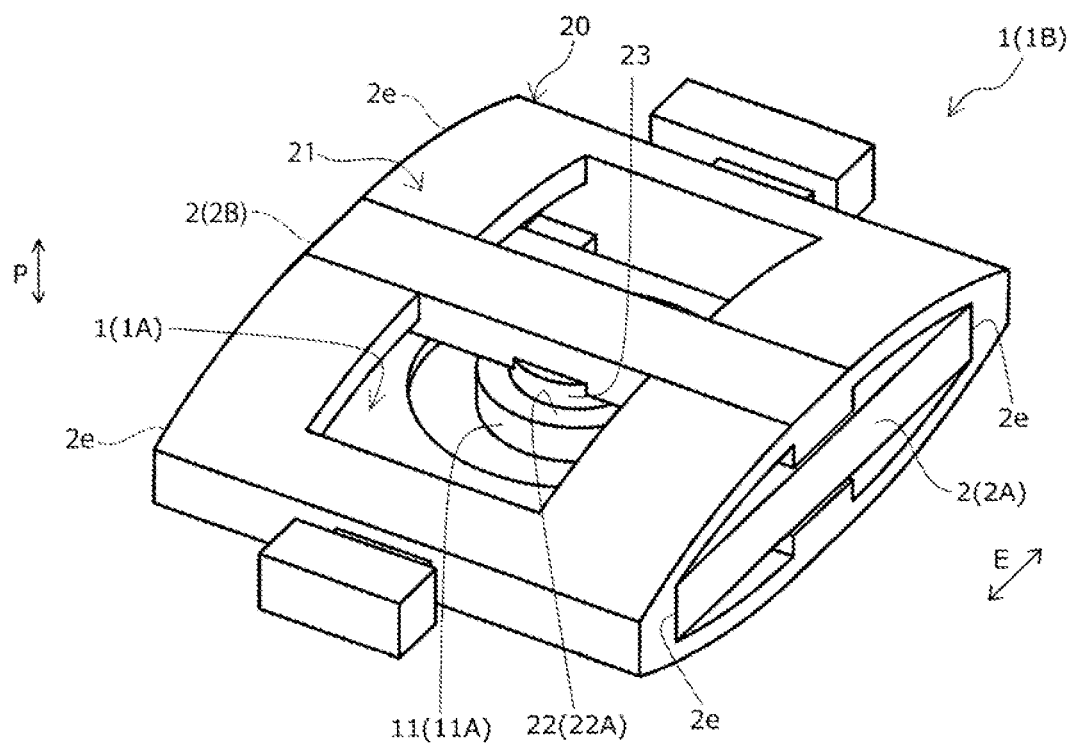
FIG. 8 is a schematic perspective view of a diaphragm compressor according to Example 2 of the present disclosure.
Figure 9:
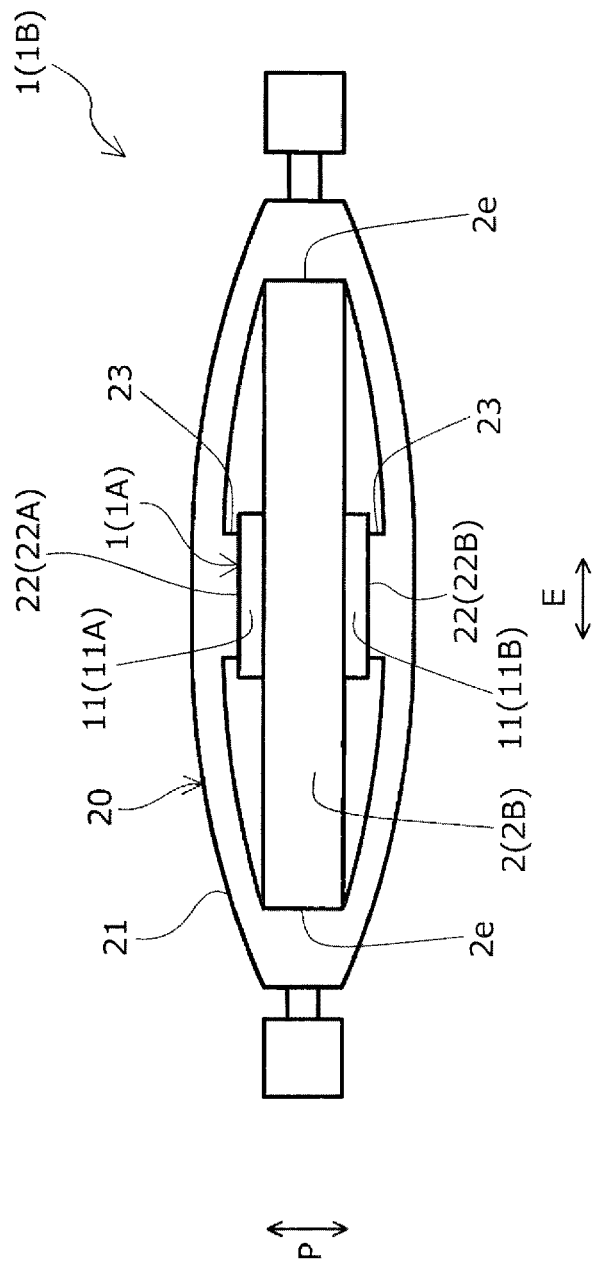
FIG. 9 is a schematic side view of the diaphragm compressor according to Example 2 of the present disclosure.
Figure 10:
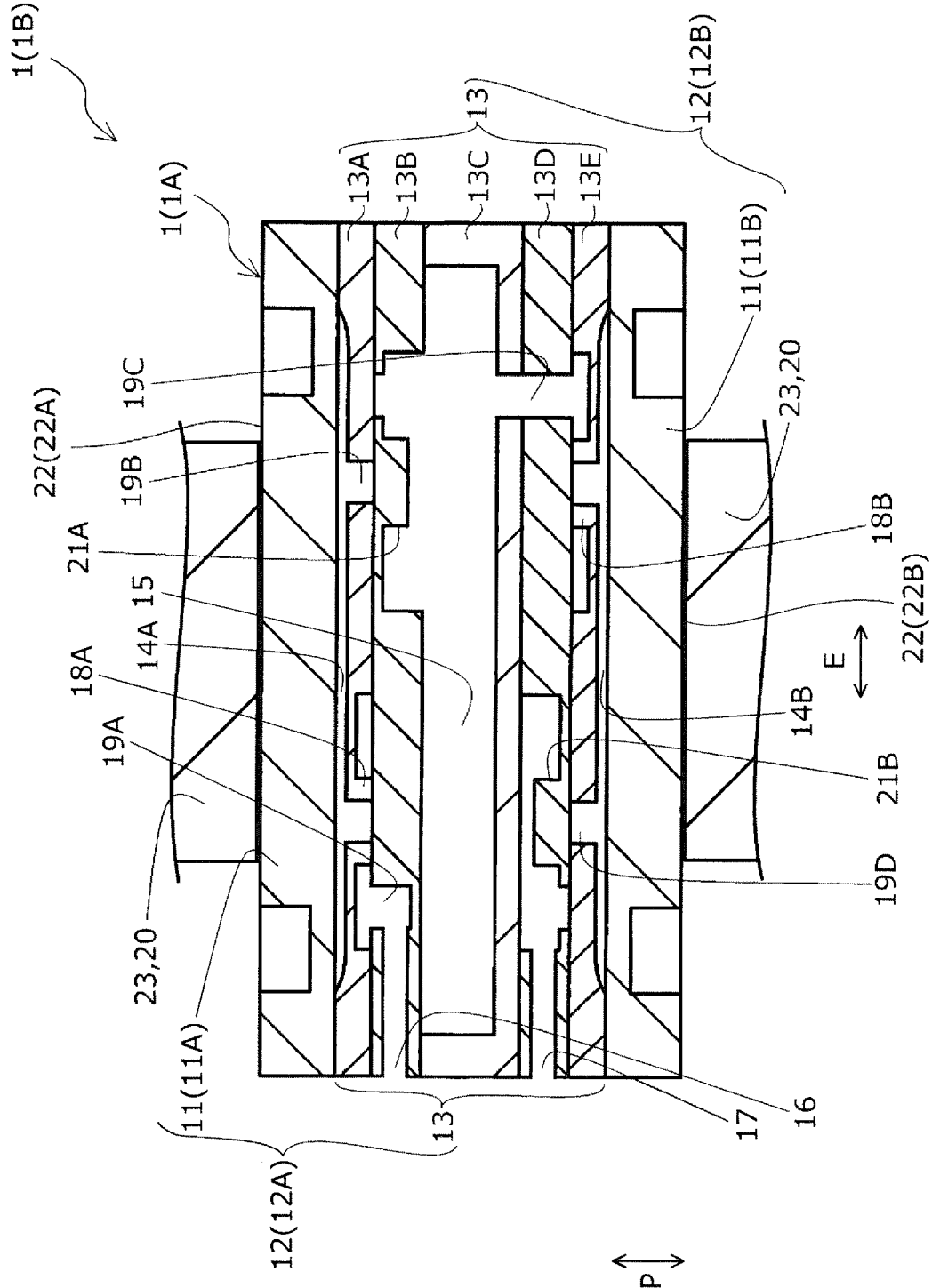
FIG. 10 is a schematic front sectional view showing the diaphragm compressor according to Example 2 of the present disclosure by omission of part of component members.

As shown in FIGS. 8 and 9, the diaphragm compressor 1B of the example includes the displacement expanding device 20 having a displacement member 21 in a nearly cylindrical shape in which coupling parts 23 coupled to the pressing parts 22 are provided. Further, two actuators 2 of an actuator 2A and an actuator 2B as piezoelectric elements that displace the displacement member 21 are provided inside of the displacement member 21.

As described above, the displacement expanding device 20 of the example has the displacement member 21 coupled to both of the pressing parts 22A and 22B of the two pressing parts 22 via the coupling parts 23, and the actuators 2 coupled to the displacement member 21 and displacing the displacement member 21. That is, the diaphragm compressor 1B of the example includes the displacement expanding device 20 having the above described configuration, and thereby, may effectively press the two pressing parts 22A and 22B and can particularly effectively compress the refrigerant as the fluid.

In the displacement expanding device 20 of the example, as described above, the displacement member 21 has the cylindrical shape and, as shown in FIGS. 8 and 9, the actuators 2 are placed so that displacement directions E of the actuators 2 may be directions crossing the pressing directions P of the diaphragms 11, and the insides of the displacement member 21 are coupled to both ends 2e in the displacement directions E of the actuators 2. Further, the actuators 2 are placed so that displacement directions E of the actuators 2 may be directions crossing the pressing directions P, and the actuators are coupled to the displacement member 21 in positions apart at the respective sides from the center positions of the lengths of the actuators 2 in the displacement directions E of the actuators 2. The displacement expanding device 20 of the example has the above described simple configuration. The displacement expanding device 20 has the simple configuration, and thereby, upsizing of the displacement expanding device 20 is suppressed and the particularly small diaphragm compressor 1 that can effectively compress the fluid may be obtained.

Figure 11:
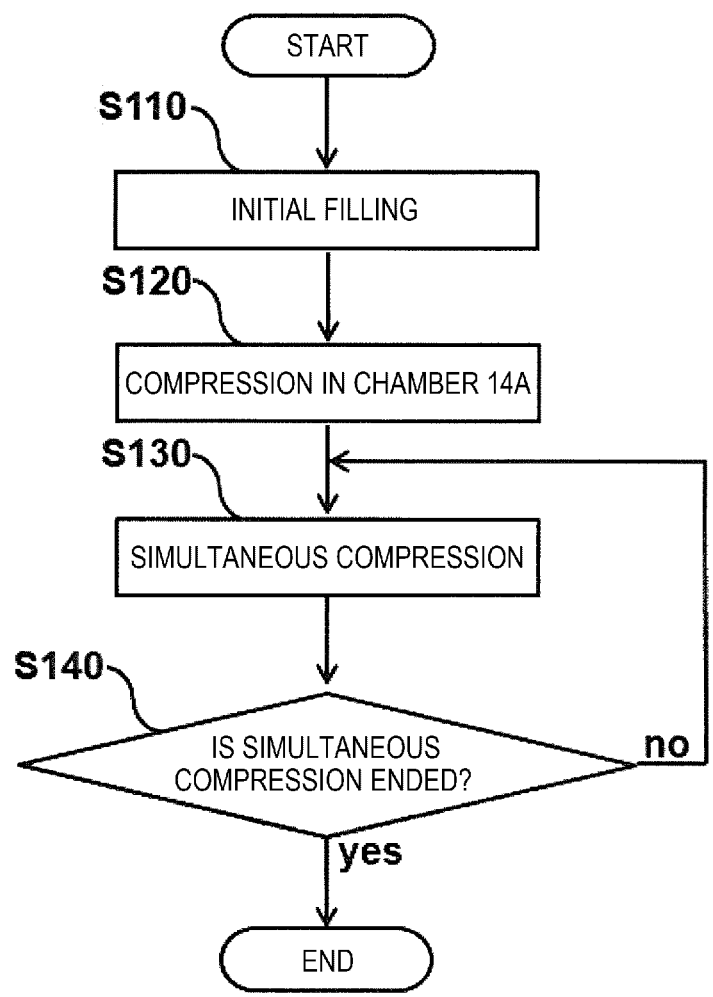
FIG. 11 is a flowchart showing an example of a driving method of the diaphragm compressor according to Example 2 of the present disclosure.

As below, one example of a specific driving method of the diaphragm compressors 1 of Examples 1 and 2 will be explained using the flowchart in FIG. 11. The following driving method is implemented using the diaphragm compressor 1A of Example 1 by a device that can individually press the diaphragm 11A and the diaphragm 11B using a first actuator (not shown) that presses the diaphragm 11A and a second actuator (not shown) that presses the diaphragm 11B. As described above, the diaphragm compressors 1 of Examples 1 and 2 include the buffer chambers 15, and may simultaneously compress the fluid in the chambers 14A and 14B at fewer steps. Note that the fluid is simultaneously compressed in the chambers 14A and 14B, and thereby, the compression efficiency of the fluid may be improved.

In the driving method of the example, first, an initial filling step at step S110 is executed. At the initial filling step, the inlet valve 18A opens. Note that the inlet valve 18A automatically opens without driving of the first actuator or second actuator. This is because pressure is higher at the upstream of the inlet valve 18A than that at the downstream of the inlet valve 18A in the direction in which the fluid flows from the inlet port 16 to the outlet port 17. Here, at the initial filling step, driving of the first actuator and the second actuator is off, the outlet valve 21A is closed, the inlet valve 18B is closed, and the outlet valve 21B is closed.

Then, a compression step in the chamber 14A at step S120 is executed. At the compression step in the chamber 14A, first, at the first step, the driving of the first actuator is turned on and the diaphragm 11A is pressed. With the driving of the first actuator turned on, the inlet valve 18A automatically closes. Note that, in the initial period of time when the driving of the first actuator is turned on, the outlet valve 21A does not open. This is because the conductance of the fluid path 19B connecting to the buffer chamber 15 is lower in the initial period of time when the driving of the first actuator is turned on. Here, at the first step, the driving of the first actuator is on and the driving of the second actuator is off, the inlet valve 18A is closed, the outlet valve 21A is closed, the inlet valve 18B is closed, and the outlet valve 21B is closed. Then, at the second step, the driving of the second actuator is turned on and the driving of the first actuator is kept on. The driving of the first actuator is kept on, and thereby, despite the lower conductance of the fluid path 19B, the outlet valve 21A automatically gradually opens. Then, the inlet valve 18A is kept closed, the closed outlet valve 21A is opened, the inlet valve 18B is kept closed, and the outlet valve 21B is kept closed.

Then, a simultaneous compression step at step S130 is executed. At the simultaneous compression step, first, at the first step, the fluid is drawn into the chamber 14A and the fluid is also drawn into the chamber 14B. Concurrently, the driving of the first actuator and the second actuator is off, the inlet valve 18A is opened, the outlet valve 21A is closed, the inlet valve 18B is opened, and the outlet valve 21B is closed. Then, at the second step, the fluid is compressed in the chamber 14A and the fluid is compressed in the chamber 14B. Concurrently, the driving of the first actuator and the second actuator is turned on, the inlet valve 18A is closed, the outlet valve 21A is closed, the inlet valve 18B is closed, and the outlet valve 21B is closed. Then, at the third step, the fluid is ejected from the chamber 14A and the fluid is ejected from the chamber 14B. Concurrently, the driving of the first actuator and the second actuator is kept on, the inlet valve 18A is closed, the outlet valve 21A is opened, the inlet valve 18B is closed, and the outlet valve 21B is opened. As described above, the simultaneous compression step is formed by the three steps from the first step to the third step.

Then, a simultaneous compression end determination step at step S140 is executed. At the simultaneous compression end determination step, when a determination that the simultaneous compression is not ended is made, the process returns to the simultaneous compression step at step S130. On the other hand, at the simultaneous compression end determination step, when a determination that the simultaneous compression is ended is made, the driving method of the example is ended.

Note that, in the driving method of the example, the initial filling step at step S110 and the compression step in the chamber 14A at step S120 are executed as described above. However, a driving method to start the driving method after the diaphragm compressor 1 is filled with the fluid and repeat the simultaneous compression step at step S130 and the simultaneous compression end determination step at step S140 may be executed. That is, the initial filling step at step S110 and the compression step in the chamber 14A at step S120 may be set as other steps than the driving method of the above described example. For example, the initial filling step at step S110 and the compression step in the chamber 14A at step S120 are set as other steps than the driving method of the above described example, and thereby, the driving method to repeat the simultaneous compression step at step S130 and the simultaneous compression end determination step at step S140 may be executed using the diaphragm compressor 1B of Example 2. By execution of the driving method to repeat the simultaneous compression step at step S130 and the simultaneous compression end determination step at step S140 using the diaphragm compressor 1B of Example 2, the simultaneous compression step at step S130 may be executed at the three steps from the first step to the third step, i.e., at the smaller number of steps.

Next, for reference, a reference example of a driving method in a case using a diaphragm compressor not including the buffer chamber 15, the outlet valve 21A, or the inlet valve 18B, but including an outlet/inlet valve serving as both the outlet valve 21A and the inlet valve 18B instead in comparison to the diaphragm compressor 1A of Example 1 will be explained. Note that a flowchart in the reference example of the driving method is the same as the flowchart in FIG. 11. Further, the initial filling step at step S110 and the simultaneous compression end determination step at step S140 are the same as those of the driving method of the above described example except that opening and closing of the outlet valve 21A and the inlet valve 18B are replaced by opening and closing of the outlet/inlet valve, and the detailed explanation thereof will be omitted.

At the compression step in the chamber 14A at step S120 in the reference example, like the above described example, at the first step, the driving of the first actuator is turned on and the diaphragm 11A is pressed. With the driving of the first actuator turned on, the inlet valve 18A automatically closes. Then, at the second step, unlike the above described example, the driving of the first actuator is kept on without turning on of the driving of the second actuator. The driving of the first actuator is kept on, and thereby, the outlet/inlet valve automatically opens. Then, the inlet valve 18A is kept closed, the closed outlet/inlet valve is opened, and the outlet valve 21B is kept closed.

Then, at the simultaneous compression step at step S130, first, at the first step, the fluid is drawn into the chamber 14A. Concurrently, the driving of the first actuator and the second actuator is off, the inlet valve 18A is opened, the outlet/inlet valve is closed, and the outlet valve 21B is closed. Then, at the second step, the fluid is compressed in the chamber 14A and the fluid is compressed in the chamber 14B. Concurrently, the driving of the first actuator and the second actuator is turned on, the inlet valve 18A is closed, the outlet/inlet valve is closed, and the outlet valve 21B is closed. Then, at the third step, the fluid is ejected from the chamber 14B. Concurrently, the driving of the first actuator and the second actuator is kept on, the inlet valve 18A is closed, the outlet/inlet valve is closed, and the outlet valve 21B is opened. Then, at the fourth step, the fluid is drawn into the chamber 14B. Concurrently, the driving of the first actuator and the second actuator is off, the inlet valve 18A is closed, the outlet/inlet valve is opened, and the outlet valve 21B is closed. As described above, the simultaneous compression step is formed by the four steps from the first step to the fourth step.

As described above, while the simultaneous compression step in the driving method of the example is formed by the three steps, the simultaneous compression step in the driving method of the reference example is formed by the four steps. That is, the flowrate of the fluid in the driving method of the example is higher than the flow rate of the fluid in the driving method of the reference example. Further, the simultaneous compression step is repeated, and thereby, the difference in flow rate of the fluid is obvious between the driving method of the example and the driving method of the reference example.

The present disclosure is not limited to the above described examples, but various modifications can be made within the scope of the present disclosure described in the appended claims, and the modifications obviously fall within the scope of the present disclosure. For example, the diaphragm compressor 1 of the present disclosure may be applied to other various apparatuses including a robot than the projector 100, the recording apparatus 200, and the three-dimensional modeled object manufacturing apparatus 300. Further, a displacement expanding device having a completely different configuration from that of the above described displacement expanding device 20 of Example 1 may be provided.

What is claimed is:

1. A diaphragm compressor comprising:
    a first structure having a first pressing part, a first diaphragm, and a first substrate partially separated from the first diaphragm and partially joined to the first diaphragm, the first diaphragm and the first substrate being stacked in a stacking direction;

a second structure having a second pressing part, a second diaphragm, and a second substrate partially separated from the second diaphragm and partially joined to the second diaphragm, the second diaphragm and the second substrate being stacked in the stacking direction;

a displacement housing configured to house the first and second structures, the displacement housing having a first wall, a second wall, a third wall, and a fourth wall, the first wall being opposite to the second wall along the stacking direction, the third wall being opposite to the fourth wall along a first direction orthogonal to the stacking direction, the third and fourth walls respectively connecting between the first and second walls; and an actuator configured to be displaced so as to displace the displacement housing, wherein the first structure and the second structure are stacked in the stacking direction, the first pressing part is placed at a side of the first diaphragm opposite to the first substrate, and a first separation portion between the first diaphragm and the first substrate is part of a first channel in which a fluid flows, the second pressing part is placed at a side of the second diaphragm opposite to the second substrate, and a second separation portion between the second diaphragm and the second substrate is part of a second channel in which the fluid flows, the first channel and the second channel are placed in series, as seen from the stacking direction, the first pressing part overlaps the second pressing part, a buffer chamber holding the fluid is provided between the first channel and the second channel, the first wall and the second wall of the displacement housing are coupled to the first pressing part and the second pressing part, respectively, and the actuator is coupled to the displacement housing via the third wall and the fourth wall.

2. The diaphragm compressor according to claim 1, wherein
the actuator is configured to be displaced in the first direction, and
the actuator has a first end a second end opposite to each other along the first direction, and the first end and the second end are coupled to the third wall and the fourth wall of the displacement housing, respectively.

3. A cooling unit comprising:
a diaphragm compressor, the diaphragm compressor including:
  a first structure having a first pressing part, a first diaphragm, and a first substrate partially separated from the first diaphragm and partially joined to the first diaphragm, the first diaphragm and the first substrate being stacked in a stacking direction;
  a second structure having a second pressing part, a second diaphragm, and a second substrate partially separated from the second diaphragm and partially joined to the second diaphragm, the second diaphragm and the second substrate being stacked in the stacking direction;
  a displacement housing configured to house the first and second structures, the displacement housing having a first wall, a second wall, a third wall, and a fourth wall, the first wall being opposite to the second wall along the stacking direction, the third wall being opposite to the fourth wall along a first direction orthogonal to the stacking direction, the third and fourth walls respectively connecting between the first and second walls; and
  an actuator configured to be displaced so as to displace the displacement housing,
a heat dissipation section for a fluid;
a heat exchanger section for the fluid; and
an expansion section for the fluid,
wherein the diaphragm compressor is placed between the heat exchanger section and the heat dissipation section,
the first structure and the second structure are stacked in the stacking direction,
the first pressing part is placed at a side of the first diaphragm opposite to the first substrate, and a first separation portion between the first diaphragm and the first substrate is part of a first channel in which the fluid flows,
the second pressing part is placed at a side of the second diaphragm opposite to the second substrate, and a second separation portion between the second diaphragm and the second substrate is part of a second channel in which the fluid flows,
the first channel and the second channel are placed in series,
as seen from the stacking direction, the first pressing part overlaps the second pressing part,
a buffer chamber holding the fluid is provided between the first channel and the second channel,
the first wall and the second wall of the displacement housing are coupled to the first pressing part and the second pressing part, respectively, and
the actuator is coupled to the displacement housing via the third wall and the fourth wall.

4. A projector comprising:
a light source;
a panel absorbing light;
a heat exchange medium; and
the cooling unit according to claim 3, wherein
the heat exchange medium is provided between one of the light source and the heat exchanger section or between the panel and the heat exchanger section.

5. A recording apparatus comprising:
a recording head ejecting an ink;
an electronic circuit board coupled to the recording head;
a heat exchange medium; and
the cooling unit according to claim 3, wherein
the heat exchange medium is provided between one of the recording head and the heat exchanger section or the electronic circuit board and the heat exchanger section.

6. A three-dimensional modeled object manufacturing apparatus comprising:
a hopper holding a raw material as a constituent material of a three-dimensional modeled object;
a melting unit melting the raw material;
a feed path for feeding the raw material from the hopper to the melting unit;
a heat exchange medium; and
the cooling unit according to claim 3, wherein
the heat exchange medium is provided between the feed path and the heat exchanger section.

* * * * *